United States Patent

[11] 3,551,733

| [72] | Inventor | Robert M. Johnson<br>Portland, Oreg. |
|---|---|---|
| [21] | Appl. No. | 813,945 |
| [22] | Filed | Apr. 7, 1969 |
| [45] | Patented | Dec. 29, 1970 |
| [73] | Assignee | Tektronix, Inc.<br>Beaverton, Oreg.<br>a corporation of Oregon |

[54] MULTIPLE SWEEP DISPLAY
18 Claims, 4 Drawing Figs.

[52] U.S. Cl. .............................................. 315/22,
315/25; 324/121
[51] Int. Cl. ....................................... H01j 29/52,
H01j 29/72
[50] Field of Search ........................................ 315/22, 24,
25; 324/121

[56] References Cited
UNITED STATES PATENTS

| 2,849,609 | 8/1958 | Casey ........................... | 324/121X |
| 2,928,003 | 3/1960 | Etter ............................. | 315/24X |
| 2,368,448 | 1/1945 | Cook. | |
| 2,368,449 | 1/1945 | Cook. | |
| 2,375,709 | 5/1945 | Thompson. | |
| 2,406,382 | 8/1946 | Kellogg. | |
| 2,416,320 | 2/1947 | Jeanne. | |
| 2,496,970 | 2/1950 | Wertz. | |
| 2,962,625 | 11/1960 | Berwin. | |
| 3,167,680 | 1/1965 | Seestrom. | |
| 3,176,506 | 4/1965 | Dory. | |

*Primary Examiner*—Richard A. Farley
*Assistant Examiner*—T. H. Tubbesing
*Attorney*—Buckhorn, Blore, Klarquist and Sparkman

ABSTRACT: The sweep circuitry of a cathode ray oscilloscope includes first and second independently operable time base generators. The first is triggerable in timed relation with an input waveform, and the second controls the horizontal electron beam deflection in a cathode ray tube. The second time base generator is adjustably triggered from the sweep waveform output of the first time base generator as the latter reaches a selected value. Prior to triggering of the second time base generator, the output of the second time base generator is completely controlled by the first, but after triggering, the second time base generator output is adjustable entirely independently of the first.

FIG. 1

ROBERT M. JOHNSON
INVENTOR

BY
BUCKHORN, BLORE, KLARQUIST & SPARKMAN
ATTORNEYS

FIG. 3

DISPLAY DURING A SWEEP | DISPLAY DURING B SWEEP

MULTIPLE SWEEP DISPLAY

BACKGROUND OF THE INVENTION

In cathode ray tube apparatus it is frequently desirable to be able to select and magnify the display of one portion of an input waveform with respect to other portions thereof. One method of accomplishing this selection and magnification involves first intensifying the display of the waveform portion of interest, and then switching the apparatus circuitry so that the intensified portion occupies the full cathode ray tube screen. First and second sweep generators are employed wherein the second, having a faster sweep rate, is triggered at some point during the sweep waveform of the first, for either intensifying a portion of a display, or providing an independent display. While this system has many desirable features, it does not permit the operator to view both the magnified portion and the overall signal at the same time.

A prior system of permitting the viewing of both an overall signal and a magnified portion includes two time base generators having differing sweep rates and which are triggered at different times, wherein the time base generator outputs are combined or added for bringing about deflection of a cathode ray tube beam. However, since the sweep waveforms are added, the sweep rates are not independently adjustable, and accurate measurements cannot be easily made with reference to the display. The same problem arises when a single time base generator is utilized having a timing circuit or a time constant circuit which is switchable so that sweep rate can be changed during the production of a sweep waveform. The magnification is usually with respect to the sweep rate of the demagnified signal portion and is not ordinarily independently controllable. Alternatively, exchange of one timing circuit component for another during the production of a sweep waveform leads to switching problems.

One circuit for providing display of unmagnified and magnified portions of an input signal waveform includes a pair of time base generators which switchably control cathode ray tube deflection apparatus in the alternative. This system has the advantage of allowing independent calibrated adjustment in the sweep rates for the unmagnified and magnified portions of the input signal whereby measurements may be made with respect thereto. During a first or slow sweep waveform, a second sweep waveform is triggered. However, before the second sweep waveform is effective to produce a magnified display portion, the valve thereof must catch up to the value of the slow sweep waveform, whereby switching means permits the second sweep waveform to take over. This leads to lack of accuracy in control of the starting time of the magnified portion, because the starting time of the magnified display will always be at some time after the triggering of the fast sweep generator, the delay being different with differing triggering points of the second sweep waveform. Prior circuitry also concludes the first time base generator sweep output when the second time base generator output concludes, for avoiding confusion or overlapping displays at the end of the second time base generator output. However, this method causes the repetition rate of the first sweep generator to be dependent upon the triggering and rate of the second sweep. Thus, at the end of the output of the second sweep generator, the first sweep generator may be immediately retriggered by the input signal after holdoff. Therefore, if the triggering time of the second time base generator is varied, the repetition of the first sweep generator changes, which may cause the display to jitter as the triggering point of the first time base generator changes.

SUMMARY OF THE INVENTION

According to the present invention, first and second time base generators are included in sweep circuitry for a cathode ray tube oscilloscope. The first time base generator is triggered in timed relation with an input waveform, while at least the second time base generator controls deflection means of a cathode ray tube. The second time base generator is adjustably triggered during the production of a sweep waveform from the first time base generator, but before triggering of the second time base generator the second time base generator output is controlled by the output of the first time base generator. When the second time base generator is triggered, the output thereof is at the level the first time base generator output has reached, but now the second time base generator comes into independent operation for generating a sweep waveform which is independently adjustable. As a consequence of this invention, not only are the sweep rates of the unmagnified and magnified portions of the display independently controllable and calibrated so that measurements may be made with respect to the display, but also the starting time of the magnified portion of the display is accurately controllable since the second time base generator output resides at the level reached by the first time base generator when the second time base generator is triggered.

The second time base generator is triggered and produces its sweep waveform without concluding the output of the first time base generator. Moreover, the first time base generator output does not conclude prior to its normal end value even though the second time base generator output concludes in the meantime. Therefore, the repetition rate of the first time base generator is independent of the second time base starting point and sweep rate, and jitter in the display is less likely to occur. Means are provided for blanking the cathode ray tube beam from the end of the second time base generator output until the end of the retrace and holdoff period for the first time base generator output in order to prevent a confusion of images on the cathode ray tube screen.

It is accordingly an object of the present invention to provide an improved multiple sweep display for an oscilloscope, having accurately controllable magnified and demagnified display portions.

It is another object of the present invention to provide an improved multiple sweep display in a cathode ray oscilloscope wherein the start of a magnified portion is accurately controllable with respect to an unmagnified portion.

It is another object of the present invention to provide an improved multiple sweep display for a cathode ray oscilloscope wherein accurate measurements may be made from the display.

It is yet another object of the present invention to provide an improved multiple sweep display for a cathode ray oscilloscope wherein problems of jitter are alleviated due to the uniform triggering of a nonmagnified display portion.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DETAILED DESCRIPTION

Figure 1:
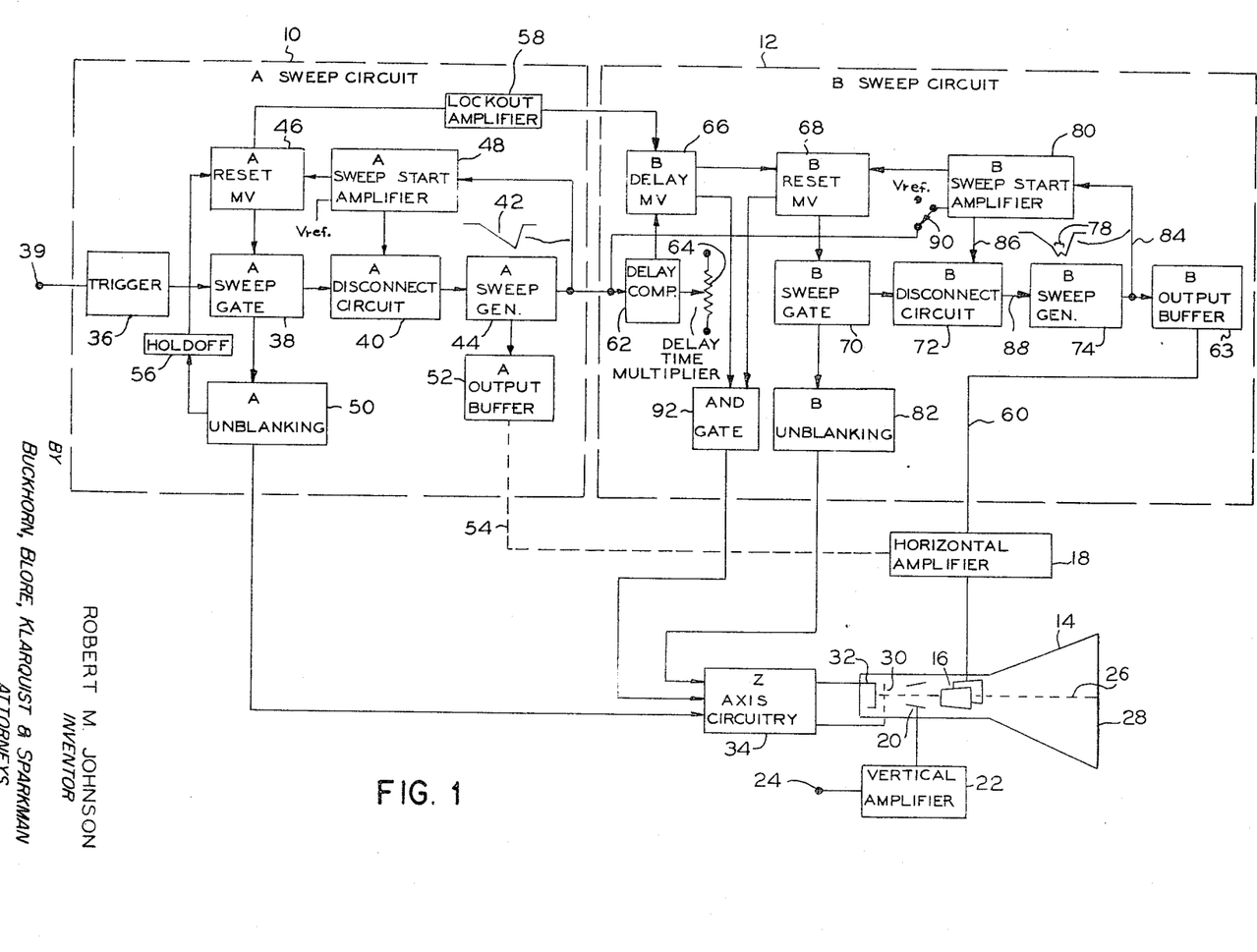
FIG. 1 is a block diagram of a combined sweep display circuit according to the present invention.

Referring to FIG. 1, a combined sweep display circuit comprises a first or A sweep circuit 10 and a second or B sweep circuit 12 forming portions of an oscilloscope also provided with a cathode ray tube 14. Cathode ray tube 14 has horizontal deflection plates 16 driven by horizontal amplifier 18, and vertical deflection plates 20 driven by vertical amplifier 22.

The horizontal amplifier 18 is operated by B sweep circuit 12, in a preferred mode of operation, but may also be operated by the A sweep circuit. An input signal waveform to be displayed is appropriately applied at terminal 24 comprising the input of the vertical amplifier whereby electron beam 26 is caused to move vertically across cathode ray tube screen 28, as horizontal deflection plates 16 cause the electron beam to move horizontally across screen 28 for providing a time base sweep in the usual manner.

Cathode ray tube 14 also includes a control grid 30 and a cathode 32 connected to Z-axis circuitry 34 for controlling the cathode and grid in order that electron beam 26 is generated at certain times and blanked at other times. For example, the electron beam is blanked during the retrace interval between time base sweeps.

The A sweep circuit 10 includes a trigger circuit 36 receiving a trigger input at terminal 39, which may be derived via a suitable trigger pickoff from the input signal. Trigger circuit 36 drives A sweep gate 38 which in turn operates A disconnect circuit 40 at such time as an A sweep waveform 42 is to be generated. Operation of the A disconnect circuit 40 disconnects A sweep generator 44 from a reference voltage source and allows the A sweep generator to "run down" in a linear manner producing sweep waveform 42. The A sweep generator 44 includes a first timing circuit or time constant circuit such as a capacitor and resistor combination, and adjustment means for selecting components values thereof so as to change the sweep rate, that is the slope and duration of an A sweep waveform 42. The A sweep generator 44 is preferably a Miller integrator circuit as hereinafter more fully described. When A sweep waveform 42 reaches a specified value, the output of A sweep generator 44 triggers A reset multivibrator 46 through A sweep start amplifier 48. The A reset multivibrator 46 turns off the A sweep gate 38 for concluding the generation of the sweep waveform.

While A sweep waveform 42 is being generated, A sweep gate 38 energizes A unblanking circuit 50 which delivers a signal to Z-axis circuitry 34 causing the production of electron beam 26 for the duration of the negative-going portion of the A sweep waveform 42. The A sweep waveform 42 may be delivered to horizontal amplifier 18 through A output buffer 52, as indicated by dashed line 54, whereby the A sweep waveform would cause movement of the electron beam horizontally across the screen of the cathode ray tube 14. At the conclusion of the downward going portion of A sweep waveform 42, A sweep gate 38 is disconnected, and the unblanking signal from A unblanking circuit 50 is discontinued whereby no retrace would appear on the screen of the cathode ray tube.

At the conclusion of the sweep, A unblanking circuit 50 operates holdoff circuit 56 which is connected for maintaining A reset multivibrator 46 in its reset condition until recovery of the circuitry, that is, until the A sweep circuit is ready to produce another sweep waveform. Then, A reset multivibrator 46 is set such that A sweep gate 38 can receive another trigger from trigger circuit 36 for the generation of another sweep waveform. During the holdoff period, lockout amplifier 58 disables the B sweep circuit 12 as will hereinafter be more fully described.

Between sweeps, the reference level of A sweep generator 44 is held at a predetermined value by a negative feedback loop or control circuit comprising A sweep generator 44, A sweep start amplifier 48, and A disconnect circuit 40. During this time, the output of A sweep generator 44 is compared with a reference voltage in A sweep start amplifier 48, and A sweep start amplifier 48 provides an input to A sweep generator 44 between sweep waveform outputs, such that the output of the A sweep generator 44 equals the reference voltage applied within the A sweep start amplifier 48. At this time, the time constant circuit in A sweep generator 44 neither charges nor discharges, but is held at a predetermined level.

According to the preferred mode of operation of the present invention, the B sweep circuit 12 is connected to operate horizontal amplifier 18, and therefore the horizontal deflection plates 16, by way of lead 60 from B output buffer 63 to the horizontal amplifier. The B sweep circuit or time base generator is triggered into operation at a predetermined time after the start of A sweep waveform 42. The circuit includes a delay comparator 62 which comprises a voltage comparison circuit for receiving the A waveform 42 output of A sweep generator 44, and comparing the same with a voltage derived across delay time multiplier 64. The latter comprises a potentiometer disposed between a pair of voltages suitably comprising the maximum value and minimum value of waveform 42. When the A sweep waveform 42 reaches the value set by delay time multiplier 64, delay comparator 62 causes B delay multivibrator 66 to operate assuming the same in not locked out by lockout amplifier 58. That is, B delay multivibrator 66 can operate at any time during an A sweep waveform. B delay multivibrator 66 sets B reset multivibrator 68, which in turn operates B sweep gate 70. B sweep gate 70 causes B disconnect circuit 72 to disconnect B sweep generator 74, allowing the same to produce B sweep waveform 78, at a faster rate than the A sweep waveform. This B sweep waveform is delivered to horizontal amplifier 18 causing horizontal deflection of electron beam 26 via B output buffer 63. The B sweep generator 74 preferably comprises a Miller integrator circuit including a timing circuit or time constant circuit comprising a resistor and capacitor, and adjustment means to select component values thereof in order to adjust the sweep rate of the B sweep waveform 78.

When the B sweep waveform 78 reaches a predetermined value, B reset multivibrator 68 is reset via B sweep start amplifier 80 causing B reset multivibrator 68 to deenergize B sweep gate 70 for stopping the sweep. So long as the B sweep continues, that is so long as waveform 78 is negative-going, B sweep gate 70 operates B unblanking circuit 82 which may be operated to control the Z-axis circuitry for producing electron beam 26.

As in the A sweep circuit, before the production of a sweep waveform the B sweep generator 74 is controlled so the output thereof resides at a reference level. A negative feedback circuit comprising B sweep generator 74, connection 84, B sweep start amplifier 80, connection 86, B disconnect circuit 72, and connection 88 provides a control circuit whereby the starting level of the B sweep generator is preset. The time constant circuit in the B sweep generator 74 does not then operate under its own control and no capacitor charging or discharging thereof is permitted, except under the control of the reference applied to B sweep start amplifier 80. If switch 90 is thrown to its upper position, or to a DC reference voltage, the output of the B sweep generator is held at the level of such reference voltage.

In accordance with the present invention, however, switch 90 may be selectively thrown to a lower position whereby the reference level of the B sweep start amplifier is the output level of A sweep generator 44, e.g. the level at any instant of A sweep waveform 42, produced by A sweep generator 44.

An AND gate 92 in B sweep circuit 12 receives input from B delay multivibrator 66 and B reset multivibrator 68, and when both of the latter circuits are in a predetermined state, AND gate 92 controls Z-axis circuitry 34 such that electron beam 26 is blanked out. As will hereinafter become more evident, it is desired that the electron beam be blanked from the conclusion of the B sweep until the A sweep also concludes. This period corresponds to the time when B delay multivibrator 66 is set and B reset multivibrator is reset. When both such signals are present, AND gate 92 is energized for causing Z-axis circuitry 34 to blank electron beam 26.

Considering operation of the circuit according to the present invention, a trigger signal at terminal 39, derived in timed relation with an input waveform, operates A sweep gate 38 whereby A disconnect circuit 40 is disconnected such that the A sweep waveform 42 starts to run down. When waveform 42 reaches a predetermined value, accurately selected by means of delay time multiplier 64, delay comparator 62 causes B delay multivibrator 66 to become set. In turn, B delay multivibrator 66 sets B reset multivibrator 68, and the latter operates B sweep gate 70. B sweep gate 70 causes B disconnect circuit 72 to release B sweep generator 74 from its feedback loop whereby B sweep waveform 78 starts to run down. However, it should be noted that before the start or triggering of B sweep waveform 78, the output of B sweep generator 74 at lead 84 follows the A sweep waveform 42 inasmuch as the A sweep waveform 42 is used as a reference for B sweep start amplifier 80 via switch 90. Therefore, prior to triggering of the B sweep generator 74, the B sweep generator 74 will in effect accurately reproduce the A sweep waveform 42 and deliver the same via B output buffer 63 and horizontal amplifier 18 to the horizontal deflection plates 16 of the cathode ray tube 14. At this time, the electron beam 26 is unblanked since the A unblanking circuit 50 operates Z-axis circuitry 34 to unblank the beam during the run down of the A sweep waveform. The A sweep waveform may also be presented to the horizontal amplifier via output connection 54 from A output buffer 52, but this is unnecessary inasmuch as the same information is derived from the B output buffer without commutating or switching. An important fact to note is that at the start of the B sweep waveform 78, the B sweep waveform will have the same value as the A sweep waveform at the time the B sweep waveform is triggered. Therefore, no additional time is required for the B sweep waveform to overtake the A sweep waveform before operating the cathode ray tube. The waveform provided to the horizontal amplifier is illustrated at D in FIG. 3 wherein the combined deflection signal comprises the A sweep waveform, until such time as the B sweep generator is triggered, after which the deflection signal comprises the B sweep waveform. The A sweep waveform is illustrated at A in FIG. 3.

It is also important to note that when the B sweep waveform is triggered, by operation of B disconnect circuit 72, the B sweep waveform 78 is allowed to run down quite independently of time constant values in the A sweep generator. Thus, the slope of waveform 78 is determined entirely by the time constant of the timing circuit in the B sweep generator 74. Thus, the combined sweep is controllable during the A sweep portion solely by the values selected for the A sweep generator time constant circuit, and during the B sweep solely by circuit values chosen for the B sweep time constant circuit. These values may be separately selected for accurately predetermining the sweep rate during these two sweeps. Therefore, the timing of the display presented on screen 28 of cathode ray tube 14 may be accurately measured during both the unmagnified and magnified portions of the display.

Figure 4:
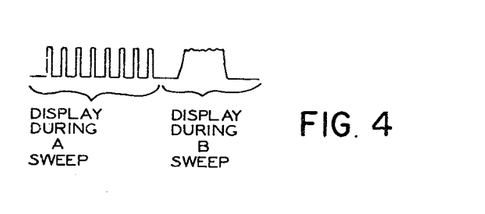
FIG. 4 is a typical oscilloscope display produced according to the present invention.

The B sweep waveform 78 generally has a much greater slope or sweep rate than the A sweep waveform 42. Therefore, the B sweep waveform will provide a more magnified presentation than the A sweep waveform. A combined presentation is illustrated in FIG. 4 where, for example, a number of pulses are illustrated as displayed during the A sweep, and wherein one of these pulses is illustrated as magnified during the B sweep.

AND gate 92 will now be considered. From waveform D in FIG. 3 it can be seen that the A waveform ordinarily continues after the conclusion of the B waveform. Thus, the B waveform does not conclude the A waveform either when the B waveform starts or when it ends. Therefore, the A waveform may be repetitively triggered from the input signal without being effected by the start or conclusion of the B waveform. Electron beam 26 is suitably blanked during the A and B retrace periods, that is during the positive-going portions of the waveform at D in FIG. 3, but there is also present a negative-going portion after the conclusion of the B waveform and before the conclusion or retrace of the A waveform. This part of the combined output would present a double image of a part of the magnified portion of the display. However, the same is blanked out by deriving signals indicating the state of B delay multivibrator 66 and B reset multivibrator 68, as hereinbefore mentioned. When the B delay multivibrator 66 is in a set state and the B reset multivibrator 68 is in a reset state, AND gate 92 is energized for bringing about blanking of electron beam 26. In the waveform chart of FIG. 3, the set condition of B delay multivibrator 66 is indicated by the negative-going output thereof, illustrated at B, and the reset condition of multivibrator 68 as indicated by the negative output portion thereof illustrated at C. The combined output of AND gate 92 is illustrated as a positive-going waveform at E in FIG. 3.

Figure 2:
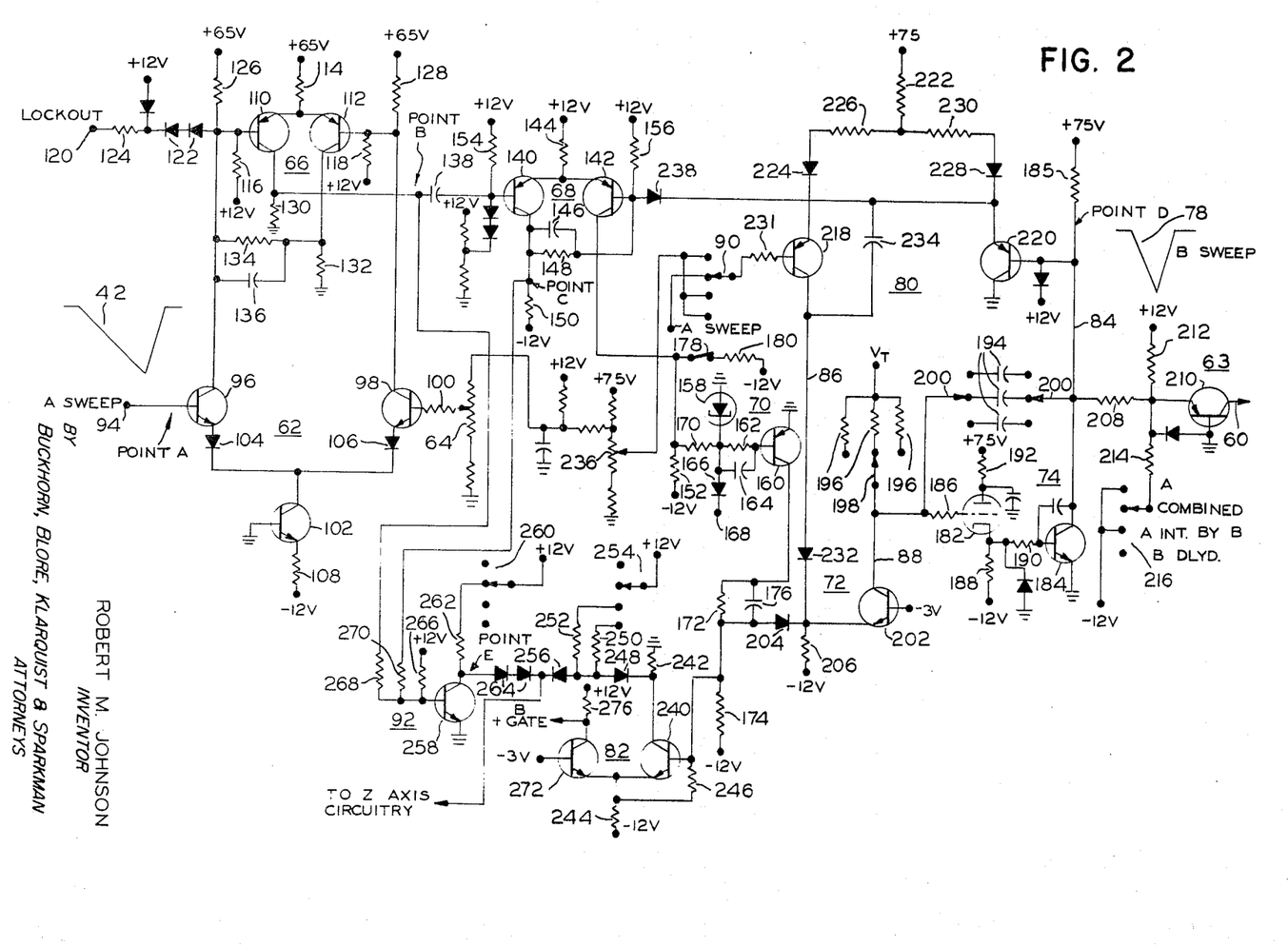
FIG. 2 is a schematic diagram of the fast sweep portion of a combined sweep display circuit according to the present invention.

FIG. 2 illustrates the B sweep circuit in greater detail. As will hereinafter be indicated, the A sweep circuit is quite similar and differs only as respects elements forming no specific part of the present invention. Referring to FIG. 2, the same reference numerals are employed in FIG. 1 with respect to the various portions of the circuit. The A sweep waveform 42 is applied to delay comparator 62 at terminal 94 connected to the base of NPN transistor 96. Delay comparator 62 also includes a second NPN transistor 98 having its base coupled to the adjustable tap of delay time multiplier potentiometer 64 via resistor 100. The emitters of transistors 96 and 98 are coupled to the collector of an NPN transistor 102 by way of diodes 104 and 106, while the emitter of transistor 102 is connected to a negative voltage source through resistor 108. The base of transistor 102 is grounded, this transistor operating as a constant current source for transistors 96 and 98. The delay time multiplier potentiometer 64 is coupled between a positive voltage source and ground. The tap on this potentiometer is adjusted for determining the point along A sweep waveform 42 at which the B sweep circuit is triggered.

B delay multivibrator 66 comprises a Schmitt trigger circuit including PNP transistors 110 and 112 having their emitters jointed and connected to a positive voltage by way of resistor 114. Resistors 116 and 118 return the transistor bases to positive voltage points, while the base of transistor 110 is coupled to lockout input terminal 120 through diodes 122 and resistor 124. Terminal 120 receives the output of lockout amplifier 58 in FIG. 1 whereby multivibrator 66 is in a predetermined condition, with transistor 110 conducting, and transistor 112 nonconducting, as long as a negative lockout signal is provided at terminal 120. At the conclusion of such lockout signal, that is after retrace and recovery of the A sweep circuit, the multivibrator 66 remains in the aforementioned condition with transistor 110 conducting, and conductor 112 nonconducting, but is triggerable to the opposite condition. Multivibrator 66 is also provided an input at the base of transistor 110 from the collector of transistor 96, and load resistor 126 for transistor 96 is returned to a positive voltage. Also, the collector of transistor 98 is connected to the base of transistor 112, and to a positive voltage through resistor 128. The collectors of transistors 110 and 112 are returned to ground employing resistors 130 and 132, respectively, while a feedback circuit comprising the parallel combination of resistor 134 and capacitor 136 is disposed between the collector of transistor 112 and the base of transistor 110.

Figure 3:
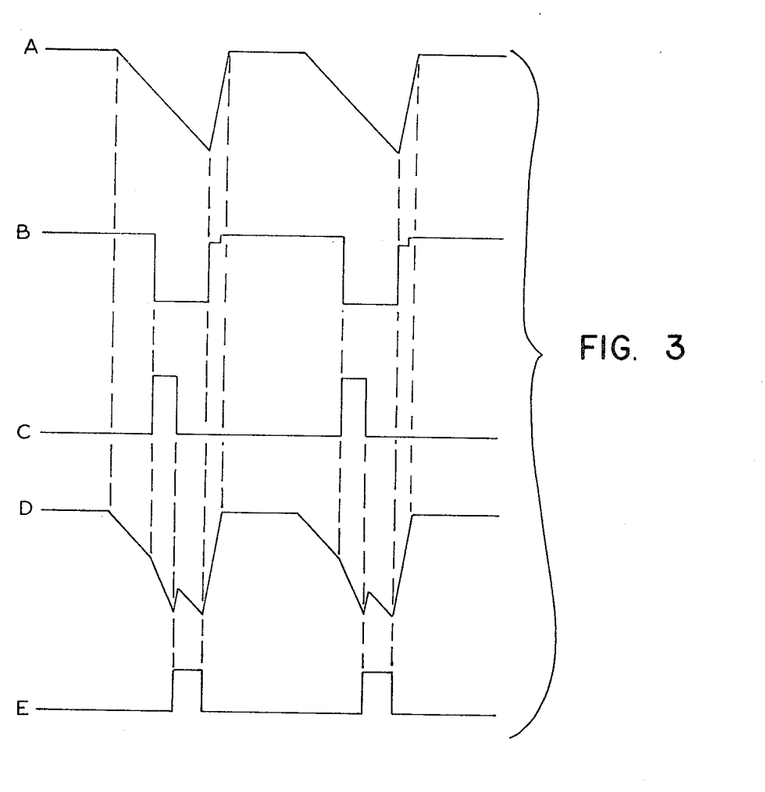
FIG. 3 is a chart of waveforms illustrating operation of the present invention.

B delay multivibrator 66 operates as a Schmitt trigger circuit such that when transistor 110 is conducting, current is drawn through resistor 114 for biasing the emitter of transistor 112 so that transistor 112 is maintained in a nonconducting condition. However, as the A sweep waveform 42 is applied to the base of transistor 96, a positive-going waveform will appear at the collector of transistor 96 and at the base of transistor 110. When this waveform reaches a sufficiently positive value, transistor 110 will tend to turn off. At the same time, the current through transistor 98 increases since a substantially constant current is provided from transistor 102. The resultant negative-going waveform at the collector of transistor 98 starts to turn transistor 112 on. A positive-going signal at the collector of transistor 112 is coupled to the base of transistor 110 through capacitor 136 causing transistor 110 to tend to turn off further. The situation is regenerative, resulting in rapid switching whereby transistor 110 rapidly turns off and transistor 112 rapidly turns on. The point at which this switching occurs is determined by the relative values applied at the bases of transistors 98 and 96, and specifically by the values selected by the setting of delay time multiplier potentiometer 64. The quiescent division of current between transistors 96 and 98 and hence the quiescent voltage drops across resistors 126 and 128 will be set by adjustment of delay time multiplier 64, and hence the level which must be reached by sweep waveform 42 before switching of multivibrator 66 takes place can be accurately determined by this setting. The delay time multiplier potentiometer 64 can be calibrated in units of graticule marking or the like on the screen 28 of cathode ray tube 14, or in some other convenient manner, for predetermining the length of the slower A sweep presentation before the B sweep starts, as illustrated in FIG. 4. When the multivibrator 66 switches, the negative-going waveform B in FIG. 3 is generated at the collector of transistor 110.

The collector of transistor 110, or point B, is coupled to B reset multivibrator 68 through capacitor 138 which is specifically connected to the base of PNP transistor 140. The emitter of transistor 140 is connected to the emitter of PNP transistor 142, and both emitters are returned to a positive voltage through resistor 144. B reset multivibrator 68 also comprises a Schmitt circuit including capacitor 146 in parallel with resistor 148 disposed between the collector of transistor 140 and the base of transistor 142. The collectors of transistors 140 and 142 are connected to negative voltage points through load resistors 150 and 152, while the transistor bases are returned to a positive voltage via resistors 154 and 156.

B reset multivibrator 68 operates in a mode similar to multivibrator 66, with transistor 140 normally being off, and transistor 142 normally conducting. When multivibrator 66 is set to the state wherein transistor 110 is shut off and transistor 112 conducts, by a selected voltage level of sweep waveform 42, the negative-going signal at the collector of transistor 110 turns transistor 140 on, and transistor 142 is shut off. As a consequence, a negative-going output is produced at the collector of transistor 142 for operating B sweep gate 70.

B sweep gate 70 comprises a tunnel diode 158 having its anode grounded and its cathode coupled to the base of PNP transistor 160 via the parallel combination of resistor 162 and capacitor 164. Diode 166 also connects the cathode of tunnel diode 158 to trigger terminal 170, while resistor 170 couples the tunnel diode cathode to the collector of transistor 142. The emitter of transistor 160 is grounded and its collector is returned to a negative voltage through resistor 172 in series with resistor 174. A capacitor 176 shunts resistor 172. Switch 178 selectively connects the collector of transistor 142 to a negative voltage through an additional resistor 180.

When the negative-going pulse at the collector of transistor 142 is applied to the cathode of tunnel diode 158 through resistor 170, the current through tunnel diode 158 increases, and the tunnel diode rapidly switches from a low voltage state to a high voltage state, and remains in such condition until reset. The rapid positive-going transition at the collector of transistor 160 is applied to B disconnect circuit 72 for allowing B sweep generator 74 to run down.

The disconnect circuit comprises a fast turn off disconnect NPN transistor 202 having its emitter returned to a negative voltage through resistor 206 and its base connected directly to a negative voltage point. The collector of transistor 202 is connected to lead 88, the latter comprising the input terminal of the B sweep generator 74.

When the tunnel diode 158 is switched to its high voltage state, a positive pulse is produced at the collector of transistor 160 and at the junction between resistors 172 and 174. This positive-going pulse is coupled to the emitter of disconnect transistor 202 of disconnect circuit 72 through diode 204. The current drawn by transistor 160 through resistor 172 and diode 204 increases or raises the voltage across resistor 206 whereby transistor 202 is cut off.

B sweep generator 74 comprises a Miller integrator circuit including a vacuum tube 182 connected as a cathode follower driving the base of an NPN transistor 184. The grid of tube 182 is coupled to input lead 88 through resistor 186, and the cathode of tube 182 is returned to a negative voltage via resistor 188 as well as being coupled to the base of NPN transistor 184 though resistor 190. Load resistor 192 connects the anode of tube 182 to a positive voltage. The collector of transistor 184 is connected to a positive voltage through a load resistor 185. A timing circuit or time constant circuit for the Miller integrator sweep generator comprises one of the capacitors 194 and one of the resistors 196 as selected by adjustment means comprising switches 198 and 200. One of the capacitors 194 is disposed between the collector of transistor 184 and lead 88, while one of the resistors 196 is adapted to charge, or discharge, a capacitor 194 from voltage source $V_T$.

Assuming transistor 202 is nonconducting, that is has been turned off, the Miller integrator sweep generator 74 will generate a negative-going ramp comprising the B sweep waveform 78. Let us assume that a capacitor 194 selected by switch 200 is initially charged to the quiescent starting level of waveform 78. The selected capacitor 194 will discharge through transistor 184 and a resistor 196 selected by switch 198. As capacitor 194 discharges, the voltage at lead 84 drops, producing a negative-going output waveform. As the capacitor voltage decreases, the discharge current from the capacitor tends to fall off, but any decrease in discharge current reduces the voltage drop across the selected resistor 196, so that the grid of tube 182 becomes more positive. Consequently, the current in tube 182 and transistor 184 will increase, and the voltage at lead 84 correspondingly drops. Thus, the discharge current in capacitor 194 remains essentially constant so that a linear run down voltage is developed.

The gain of transistor 184 is large so the signal coupled back through capacitor 194 tends to keep the voltage at the grid of tube 182 relatively constant. Thus the voltage across a selected resistor 196 remains substantially constant whereby the capacitor must discharge at a constant rate. If the capacitor discharge is at a constant rate, the voltage must decline linearly.

The output of the Miller integrator sweep generator at lead 84 is coupled through resistor 208 to B output buffer 63 and specifically to the emitter of a PNP transistor 210, the collector of which is coupled to the horizontal amplifier via lead 60. The base of transistor 210 is grounded, while the emitter thereof is also connected to the midpoint of the voltage divider comprising resistors 212 and 214 disposed between a positive voltage and the movable contact of display switch 216. As will hereinafter be more fully described, in certain positions of the display switch the transistor 210 is disabled, the switch connecting the voltage divider to a −12 volts. In the "Combined" position indicated for the switch, the transistor 210 is operative so that the B sweep waveform is delivered at output lead 60.

When the sweep waveform 78 reaches a predetermined negative value, B reset multivibrator 68 is reset through B sweep start amplifier 80. Sweep start amplifier 80 comprises a differential circuit including a PNP transistor 218 and a PNP transistor 220 wherein the emitters of these transistors are coupled to a positive voltage through a common supply resistor 222. The emitter of transistor 218 is coupled to resistor 222 through diode 224 and resistor 226, while the emitter of transistor 220 is coupled to resistor 222 via diode 228 and resistor 230. The base of transistor 220 is connected to output lead 84 of the B sweep generator, while the collector of this transistor is grounded. The base of transistor 218 is coupled to the movable terminal of switch 90 through resistor 231 and the collector of transistor 218 is connected to the emitter of transistor 202 via diode 232. Switch 90, which is operated in common with switch 216, applies the A sweep waveform 42 to the base of transistor 218 for the switch position shown. In other switch positions, the base of transistor 218 is returned to a reference voltage selected by the movable tap of potentiometer 236 disposed between a positive voltage source and ground. The collector of transistor 218 is also coupled to the emitter of transistor 220 by means of capacitor 234. Diode 238 is interposed between the emitter of transistor 220 and the base of transistor 142, wherein the anode of diode 238 is connected to the latter base.

When the B sweep waveform 78 runs down to a predetermined level, this waveform, coupled to the emitter of transistor 220, turns on diode 238 and causes current to be drawn through resistor 156. Transistor 142, which was off during the production of the B sweep waveform 78, turns on as the peak of such waveform is applied through diode 238, and transistor 140 turns off. As a result of transistor 142 going into conduction, its collector goes positive, and tunnel diode 158 reverts to its low voltage state. Therefore, transistor 160 no longer draws current through diode 204 and resistor 206, and transistor 202 turns on.

Before and after triggering of the B sweep gate, the B sweep generator 74 is connected in a negative feedback or a control circuit including B sweep start amplifier 80 comprising a differential amplifier, and B disconnect circuit 72. Assume that switch 90 couples the base of transistor 218 to the movable tap on potentiometer 236, for the moment. Normally, transistor 218 draws current through resistor 206 via diode 232 which is insufficient to cut off transistor 202. Consequently, the voltage at the collector of transistor 218 controls the voltage on lead 88. At this time, the voltage on lead 88 controls the output on lead 84 so the output at lead 84 follows or substantially duplicates the voltage applied at the base of transistor 218. If the voltage on lead 84 is too low, more current is drawn through resistors 230 and 222 lowering the voltage at the emitter of transistor 218 and lowering the voltage at the emitter of transistor 202. This lowered voltage is applied at the base of transistor 184 through cathode follower connected vacuum tube 182, whereby the voltage rises at lead 84 to the proper value. To change the output at lead 84, the voltage at the base of transistor 218 must be changed. If the tap of potentiometer 236 is adjusted to a different voltage, this different voltage will appear on lead 84. The selected capacitor 194 of the Miller integrator will be charged to the level of this voltage when the B sweep generator is triggered, i.e. at the start of B sweep waveform 78. Therefore, the differential amplifier comprising transistors 218 and 220 is called the B sweep start amplifier. Transistor 218 turns off during the B sweep.

Now, assume switch 90 is connected in the position shown, so that the A sweep is applied at the base of transistor 218. Therefore, the voltage on lead 84 will accurately follow the level of the A sweep waveform until such time as disconnect circuit 72 is operated, and the B sweep waveform starts. Thus, before the start of the B sweep waveform, the signal at lead 84 comprises the A sweep waveform, and a selected capacitor 194 is automatically charged to the level of the A sweep waveform. Selection of a different capacitor 194 or resistor 196 does not affect the value of the output on lead 84. However, the RC time constant of the B sweep timing circuit must be equal to or shorter than the RC time constant of the A sweep timing circuit in order for the B sweep output to follow the A sweep output. Then, when the B sweep waveform is triggered such that disconnect transistor 202 is shut off, the sweep generator 74 runs down at a rate completely determined by the selected capacitor 194 and resistor 196. At this time, the A sweep waveform has no effect whatever on the output at lead 84. The A sweep waveform merely establishes the starting point of the B sweep waveform. At the end of the B sweep waveform, disconnect transistor 202 is again turned on, the B sweep goes positive to the level of the A sweep, and then the output at lead 84 follows the A sweep once again. The resulting waveform is illustrated at D in FIG. 3.

To review operation of the FIG. 2 circuit, the B sweep output initially follows the A sweep waveform applied via switch 90. The A sweep waveform 42 is also applied from the A sweep circuit to delay comparator 62, and when a given level of the A sweep waveform is reached, as determined by delay time multiplier potentiometer 64, the B delay multivibrator 66 switches from a condition wherein transistor 110 is on to a condition wherein transistor 110 is off. The resulting negative-going transition is coupled via capacitor 138 to B reset multivibrator 68 wherein transistor 142 is switched from an on condition to an off condition providing a negative pulse for triggering tunnel diode 158. At this time, transistor 202 is turned off, and the Miller integrator sweep generator 74 runs down to provide B sweep waveform 78.

After the B sweep waveform starts and has reached a maximum value, transistor 142 is again switched to its on condition whereby tunnel diode 158 returns to its low voltage state, and transistor 202 comes back on. The B sweep recovers to the level of the A sweep, and once again the output of the B sweep follows the A sweep waveform. At the end of the A sweep waveform the delay multivibrator 66 is returned to its original condition wherein transistor 110 conducts, and transistor 112 is turned off by means of a lockout signal from lockout amplifier 58.

Since the output follows either the A sweep waveform or the B sweep waveform but not the addition of the two, the sweep rates of the two waveforms may be accurately and independently selected. Thus the sweep rate of the B sweep waveform is determined by the selection of a resistor 196 by switch 198 and by the selection of a capacitor 194 by switch 200. A similar selection is made with respect to the A sweep. Therefore, accurate timing measurements can be made with respect to different portions of the waveform as illustrated in FIG. 4. Thus the time per graticule marking, or the like, on the cathode ray tube screen may be determined from the sweep rate settings.

It should be noted that the A sweep circuit is substantially similar to the B sweep circuit as thus described except that no delay comparator 62, delay time multiplier 64, or delay multivibrator 66 need be included inasmuch as the A sweep circuit is directly triggered from the input signal. Thus, A trigger circuit 36 (in FIG. 1) is incorporated therein to operate the A sweep gate 38 in a manner understood by those skilled in the art. Moreover, a holdoff circuit 56 is included in the A sweep circuit and need not be incorporated in the B sweep circuit since the B sweep can only start during the period of the A sweep.

In the alternative, the B sweep circuit may be made triggerable from a signal applied at terminal 168 after a point on the A sweep waveform is reached, as determined by the setting of delay time multiplier potentiometer 64. In this mode of operation, the reset multivibrator 68 does not directly operate sweep gate 70, but rather permits sweep gate 70 to be triggered from an outside signal applied at terminal 168, after the specified delay time. To achieve this result, switch 178 is opened such that the voltage level at the collector of transistor 142 is higher when transistor 142 ceases conduction. Then, an additional negative-going trigger is required at terminal 168 in order to place tunnel diode 158 in its high voltage state. The sweep gate 38 and the A sweep circuit operates in this same manner, that is, it is operated from the trigger applied from trigger circuit 36 and is not directly operated by the A reset multivibrator. The A reset multivibrator 46 functions only for returning the tunnel diode of the A sweep gate to its low voltage state.

As will be recalled from the description of the FIG. 1 circuit operation, the cathode ray tube may be unblanked by unblanking circuits 50 and 82 during the A and B sweep waveforms. The electron beam is blanked, for example, during the retrace period of the A sweep waveform and until the A sweep is once again triggered on. The B unblanking circuit 82 as illustrated in FIG. 2 comprises an NPN transistor 240 having its base connected to the midpoint between resistors 172 and 174 and having its collector returned to ground via resistor 242. The emitter of transistor 240 is coupled to a negative voltage with resistor 244, and a resistor 246 is interposed between the emitter and base. A diode 248 couples the collector of transistor 240 to one end of resistors 250 and 252, the opposite terminals of which are connected to lower switch positions of switch 254, operated concurrently with switches 216 and 90. A diode 256 likewise couples the junction of resistors 250, 252 and diode 248 to a Z-axis circuitry input as further illustrated in FIG. 1.

Let us assume switch 254 is in its lowermost position instead of the position shown in FIG. 2. Therefore, a blanking current would normally be provided from the +12 volt source through resistor 250 and diode 256 to the Z-axis circuitry causing blanking of electron beam 26. Then, the triggering of tunnel diode 158 produces a positive pulse at the base of transistor 240 whereby current is drawn through resistor 250 cutting diode 256 off. Therefore, the blanking current theretofore applied to the Z-axis circuitry is no longer supplied through diode 256 and the electron beam is unblanked during the B sweep waveform. This mode of operation is employed when the B sweep is used by itself and B unblanking is required.

For the principal mode of operation according to the present invention, B retrace blanking is unnecessary inasmuch as other means are provided for bringing about blanking at the proper time. Thus, for the position indicated in the drawing for switch 254, neither resistor 250 nor 252 is connected. The blanking means operative for the switching position shown comprises AND gate 92.

AND gate 92 includes an NPN transistor 258 having its emitter grounded and its collector connected to a contact of switch 260, selected in the illustrated switching position, through resistor 262. Switch 260 is ganged with switches 254, 90, and 216. In the illustrated position for switch 260, +12 volts is connected to the upper end of resistor 262. The collector of transistor 258 is also connected to the Z-axis circuitry lead through diodes 264, and the base of transistor 258 is returned to a positive voltage by means of resistor 266. Resistor 268 connects the base of transistor 258 to the collector of transistor 110, while a resistor 270 couples the base of transistor 258 to the collector of transistor 140. The waveform at the latter two points, points B and C, are illustrated in FIG. 3.

Point B goes negative when the B sweep is triggered, and stays relatively negative until the positive-going A sweep retrace, that is, until the lockout amplifier reverts B delay multivibrator 66. Point C goes positive when the B sweep is triggered, and remains relatively positive until the B sweep end, at which point the B reset multivibrator 68 is reset via diode 238. At this time, point C returns to a relatively negative level. Both points B and C reside at a relatively negative level until the conclusion of the A sweep. When both points B and C reach such negative level, the collector of transistor 258 rises and a blanking current is provided the Z-axis circuitry by way of diodes 264. This blanking current continues until the delay multivibrator 66 is returned to its original condition by lockout amplifier 58. Although the blanking signal from AND gate 92 is discontinued at this time, the A unblanking current from A unblanking circuit 50 in FIG. 1 now causes the electron beam to remain blanked during the A sweep retrace and until another A sweep waveform is produced.

NPN transistor 272 has its emitter connected to the emitter of transistor 240, and its base connected to a negative voltage point, while the collector of transistor 272 is connected to a positive supply voltage through load resistor 276. This transistor provides a "B plus gate" at the collector thereof for operating external circuitry in coincidence with the B sweep waveform as may be desired.

Operation of the circuitry according to the present invention has been explained principally in connection with the described mode of operation wherein the B sweep waveform starts at the level reached by the A sweep waveform when the B sweep waveform is triggered, and after which the B sweep waveform follows an independent sweep rate, for providing a combination magnified and nonmagnified display. However, the same circuitry can be employed in other modes of operation. Switch 216, and switches 90, 254, and 260 ganged therewith, have four positions as designated at the right of switch 216 in FIG. 2. The first or top position is an A sweep position in which the B output buffer 63 is disabled so that only the A sweep can be provided to the horizontal amplifier (via connection 54 in FIG. 1). In the first position of switch 216, the emitter of transistor 210 is connected to −12 volts through resistor 214 for cutting the transistor off. The second position is the "Combined" sweep position as hereinbefore described. In the third position, designated "A Intensified by B," the B output buffer 63 is again disabled, by a connection of a −12 volts through resistor 214 to the emitter of transistor 210. However, during the latter mode of operation, switch 254 connects a +12 volts on one end of resistor 252, the opposite end of which provides a partial blanking current through diode 265 to the Z-axis circuitry. In this mode of operation, the B sweep waveform is produced during the A sweep waveform, at a point selected by delay time multiplier potentiometer 64. However, only during the production of the B sweep waveform is the electron beam completely "unblanked" by action of transistor 246. Thus, during the A sweep, and before the start of the B sweep, the trace on the cathode ray tube screen is somewhat dimmed so that any waveform portion occurring during the B sweep will be relatively intensified. No difference in the deflecting speed of the beam occurs during the B sweep in this mode of operation. In the lowest position for switch 216, the "B Delayed" position, the B sweep is produced during the A sweep, and the B sweep is applied to the horizontal amplifier from B output buffer 63, inasmuch as transistor 210 is not disabled in the lowest position of switch 216. However, in this switch position, the A sweep produces no horizontal amplifier input. That is, lead 54 is disabled by means not shown so that only a waveform portion is displayed by the B sweep. Thus, a given waveform portion may be selected in the "A Intensified by B" mode, and then displayed in the "B Delayed" mode. The "A Intensified by B" and the "B Delayed" modes are additional modes of operation of which the disclosed circuit is capable, but do not in themselves comprise methods according to the present invention.

While I have shown and described preferred embodiments of my invention, it will be apparent to those skilled in the art that many changes and modifications may be made without departing from my invention in its broader aspects.

I claim:

1. A cathode ray oscilloscope for displaying an input waveform said oscilloscope including a cathode ray tube provided with deflection means,
   a first time base generator for providing a first sweep waveform,
   a second time base generator for providing a second sweep waveform,
   means for coupling the output of said second time base generator to operate said deflection means,
   means for triggering said second time base generator during a sweep waveform output of said first time base generator,
   means for controlling the output of the second time base generator for causing it to follow the output of the first time base generator until the second time base generator is triggered,
   and means for causing said second time base generator to operate independently after triggering of said second time base generator but without concluding operation of said first time base generator.

2. The apparatus according to claim 1 wherein only said first time base generator is triggerable in timed relation with an input waveform.

3. The apparatus according to claim 1 including means for independently adjusting the sweep rates of said first and second sweep waveforms and the time during the first sweep waveform at which said second time base generator is triggered.

4. In a cathode ray tube oscilloscope for displaying an input waveform said oscilloscope including a cathode ray tube provided with deflection means,
   a first time base generator operated in timed relation with said input waveform,
   a second time base generator connected to operate said deflection means for determining a time base sweep in said oscilloscope, each of said time base generators operating independently to provide a separate sweep waveform, means for triggering said second time base generator at a predetermined time after the start of operation of the first time base generator, and means for coupling said first time base generator in controlling relation to said second time base generator causing said second time base generator to produce a deflection of the electron beam in said cathode ray tube determined by said first time base generator until the start of operation of said second time base generator, the triggering of said second time base generator causing said second time base generator then to operate independently of said first time base generator without concluding operation of said first time base generator.

5. In a cathode ray oscilloscope for displaying an input waveform, said oscilloscope including a cathode ray tube provided with deflection means, a first time base generator triggered in timed relation with said input waveform, said first time base generator including a first time constant circuit for producing a first sweep waveform, and first adjustment means to select component values for said first time constant circuit to adjust the sweep rate of said first sweep waveform, a second time base generator connected to operate said deflection means for determining a time base sweep in said oscilloscope, said second time base generator including a second time constant circuit for producing a second sweep waveform, and second adjustment means to select component values for said second time constant circuit to adjust the sweep rate of said second sweep waveform, means for triggering said second time base generator causing said second sweep waveform to start when said first sweep waveform reaches a selected value, means for coupling said first time base generator in controlling relation to said second time base generator causing said second time base generator to produce a sweep waveform output having a sweep rate determined by said first time constant circuit adjustment means, prior to the triggering of said second time base generator, and means for terminating said controlling relation when said second time base generator is triggered so that the sweep waveform output of the second time base generator is then determined independently by said second time constant circuit adjustment means.

6. The apparatus according to claim 5 wherein said means for triggering includes a voltage comparison circuit receiving said first sweep waveform as one input thereof and receiving an adjustable value as the other input thereof, and means responsive to a predetermined ratio of inputs to said voltage comparison circuit for triggering said second time base generator.

7. The apparatus according to claim 5 further including means for blanking the beam of the cathode ray tube during retrace periods of both the first and second sweep waveforms and any period therebetween from the end of the second sweep waveform until the end of the first sweep waveform.

8. The apparatus according to claim 7 wherein said means for coupling said first time base generator in controlling relation to said second base generator is effective to cause said second time base generator to return to a sweep waveform output having a sweep rate determined by said first constant circuit adjustment means, at the conclusion of said second sweep waveform.

9. The circuit according to claim 7 wherein associated with said second time base generator there is included a first multivibrator operated to a given state when said second time base generator is triggered and a second multivibrator operated to a given state at the end of the second sweep waveform, and wherein said means for blanking the beam of said cathode ray tube includes an AND gate responsive to a said given state of each of said multivibrators to blank the beam of said cathode ray tube.

10. The apparatus according to claim 5 wherein said first and second time base generators comprise Miller integrator circuits having feedback capacitors, and wherein said means for coupling said first time base generator in controlling relation to said second time base generator comprises a negative feedback circuit under the control of the output of said first time base generator for causing the output of the second time base generator to follow the output of the first time base generator, prior to triggering of said second time base generator.

11. The apparatus according to claim 10 wherein said negative feedback circuit includes a differential amplifier receiving the output of the second time base generator Miller integrator circuit and receiving the first sweep waveform to produce a control value coupled to an input of the second time base generator Miller integrator circuit causing the charge on the feedback capacitor thereof to change in accordance with said first sweep waveform.

12. The apparatus according to claim 10 wherein said means for terminating comprises disconnect means for disconnecting said negative feedback circuit when said second time base generator is triggered, for providing independent operation of said second time base generator at a sweep rate determined by said second time constant circuit adjustment means.

13. The apparatus according to claim 12 wherein said disconnect means includes a disconnect transistor, said apparatus further including a tunnel diode sweep gate operated by said means for triggering said time base generator and operating to turn off said transistor when said second time base generator is triggered.

14. The method of displaying an input waveform on an oscilloscope's cathode ray tube comprising the steps of:

deflecting the cathode ray tube's electron beam horizontally at a first independently controllable sweep rate in triggered relation with the input waveform while deflecting the beam vertically in accordance with such input waveform, and during such horizontal deflection, at an accurately predetermined time with respect to the start of such horizontal deflection, substantially immediately changing the sweep rate to a second independently controllable and faster sweep rate to provide an accurately positioned and measurable magnified display portion, said second sweep rate being independent of the value selected for said first sweep rate.

15. The method of displaying an input waveform on an oscilloscope's cathode ray tube comprising the steps of:

generating a first sweep waveform in triggered relation to the input waveform and at a first controllable sweep rate, generating a second sweep waveform at a predetermined time after the start of the first sweep waveform and at a second controllable sweep rate, deflecting the cathode ray tube's electron beam with said first sweep waveform, and at said predetermined time deflecting the cathode ray tube's electron beam with said second sweep waveform starting immediately at the value the first sweep waveform reached at said predetermined time to provide a display portion at the second sweep rate.

16. The method according to claim 15 wherein said method is repetitive in triggered relation to repetitions of the input waveform, and wherein said first sweep waveform is generated to continue for a predetermined period unaffected by the duration of the second sweep waveform so the first sweep waveform is consistently triggerable with respect to the input waveform.

17. The method according to claim 15 wherein the second sweep waveform is concluded by the conclusion of the first sweep waveform.

18. The method according to claim 15 further including blanking the cathode ray tube's electron beam between the conclusion of the second sweep waveform and the conclusion of the first sweep waveform.